(12) United States Patent
Zalanka et al.

(10) Patent No.: US 12,122,457 B1
(45) Date of Patent: Oct. 22, 2024

(54) SPACE FRAME KINETIC FRONT TRANSITION CONNECTIONS

(71) Applicant: Caterpillar Inc., Peoria, IL (US)

(72) Inventors: David O. Zalanka, Mt Zion, IL (US); Timothy D. Harman, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/367,479

(22) Filed: Sep. 13, 2023

(51) Int. Cl.
*B62D 27/02* (2006.01)
*B62D 21/02* (2006.01)
*B62D 21/11* (2006.01)

(52) U.S. Cl.
CPC ........... *B62D 27/023* (2013.01); *B62D 21/02* (2013.01); *B62D 21/11* (2013.01)

(58) Field of Classification Search
CPC ....... B62D 27/023; B62D 21/02; B62D 21/11
See application file for complete search history.

(56) References Cited

U.S. PATENT DOCUMENTS

| | | | |
|---|---|---|---|
| 4,283,156 A * | 8/1981 | Harper, Jr. | E04B 1/1903 52/81.3 |
| 9,315,083 B2 | 4/2016 | Noble et al. | |
| 10,569,810 B2 * | 2/2020 | Gami | B62D 27/02 |
| 11,186,315 B2 | 11/2021 | Miller et al. | |
| 11,358,641 B2 * | 6/2022 | Miller | B62D 21/09 |
| 11,479,306 B2 * | 10/2022 | Hasenauer | B29C 66/52441 |
| 11,884,329 B2 * | 1/2024 | Zalanka | B62D 27/023 |
| 2005/0206111 A1 | 9/2005 | Gibson et al. | |
| 2013/0175828 A1 | 7/2013 | White et al. | |

FOREIGN PATENT DOCUMENTS

| | | |
|---|---|---|
| EP | 3372426 A1 | 9/2018 |
| JP | 3849575 B2 | 11/2006 |
| WO | 2015/045152 A1 | 4/2015 |

\* cited by examiner

*Primary Examiner* — Faye M Fleming
(74) *Attorney, Agent, or Firm* — Xsensus LLC (57) ABSTRACT

A transition connection for a space frame can comprise a connection pad defining a first end of the transition connection, a node defining a second end of the transition connection opposite the first end, a pair of ribs on opposite sides, a first concave portion on a first side of one of the ribs, and a second concave portion on a second side of the one of ribs. In a side elevational view of the transition connection, an acute angle is formed on a same side as the first and second concave portions. The transition connection, which can be a casting, can be part of a pair or set of transition connections separate and distinct from each other. The pair of transition connections can be mirror images of each other.

20 Claims, 7 Drawing Sheets

SPACE FRAME KINETIC FRONT TRANSITION CONNECTIONS

TECHNICAL FIELD

The present disclosure relates to space frames, and more particularly to transition connections, and systems, components, and methods thereof.

BACKGROUND

Conventional haul trucks, such as off-highway rear haul trucks, may use welded steel frames that can be extremely heavy and may require many meters of welding to fabricate a completed frame. Space frames offer a lighter and stronger alternative to traditional welded steel frames, since far less steel is required. As a result, space frames offer considerable benefits in terms of cost, manufacturability, and performance. For example, haul trucks with space frames comparatively can haul larger payloads and consume less fuel.

Conventional space frame structures may use fabricated nodal connections. Such nodal connections may be used to create space frame structures associated with static applications. However, vehicular applications are, at least in part, dynamic in nature, and haul trucks can represent a particularly difficult application because of loads applied to the space frame as well as bending, twisting, and/or flexing that can occur as the haul truck travels on various types of terrain, such as off highway terrain. Carefully designed high-strength castings and fabrications can be required to provide appropriate stiffness and flexibility characteristics while insuring proper load transfer from the dump body to the wheels.

Japanese Patent Document No. JP 3849575 ("the JP '575 patent document") describes a sub-frame mounting structure. The sub-frame mounting structure has an intermediate wall between an upper wall and a lower wall of a sub-frame mounting bracket. An over-opening surrounded by the upper wall and the intermediate wall is open toward the rear of a vehicle body, while an under-opening surrounded by the lower wall and the intermediate wall is open toward the front of the vehicle body. The intermediate wall is formed to have a gradient so that the openings can be formed by die cutting. According to the JP '575 patent document, the sub-frame mounting structure is capable of being constructed light in weight without causing deformation.

SUMMARY

In one aspect a transition connection for a space frame, or a set of the transition connections can be provided or implemented. The set of transition connections can comprise: a first transition connection; and a second transition connection separate and distinct from the first transition connection, wherein each of the first and second transition connections includes: a connection pad defining a first end, a node defining a second end opposite the first end, a pair of ribs on opposite sides, a first concave portion on a first side of one of the ribs, a second concave portion on a second side of said one of ribs, wherein, for each of the first and second transition connections, in a side elevational view, an acute angle is formed on a same side as the first and second concave portions, and wherein the first and second concave portions are of a same configuration.

In another aspect a space frame, for instance, for an off-highway rear haul truck, can be provided or implemented. The space frame can comprise: a pair of first front transition castings spaced from each other in a width direction of the space frame; a pair of second front transition castings spaced from each other in the width direction of the space frame, wherein each of the first front transition castings is coreless and includes: a connection pad on a first end of the first front transition casting and configured to weldably attach to a bottom surface of a front upper frame connection of the space frame, and a node on a second end of the first front transition casting opposite the first end and configured to weldably attach to a first frame tube, wherein each of the second front transition castings is coreless and includes: a connection pad on a first end of the second front transition casting and configured to weldably attach to a rear mounting surface of a front lower suspension connection of the space frame, and a node on a second end of the second front transition casting opposite the first end and configured to weldably attach to a second frame tube, wherein coreless means that each of the first front transition castings and each the second front transition castings is free of any hollow portions at any of the nodes and the connection pads, wherein the pair of first front transition castings are at a first height in the space frame higher than a second height of the pair of second front transition castings, wherein, for each of the first front transition castings, in a side elevational view thereof, a connection face of the connection pad is at a first acute angle relative to a face of the node, and wherein, for each of the second front transition castings, in a side elevational view thereof, a connection face of the connection pad is at a second acute angle relative to a face of the node, the second acute angle being different from the first acute angle of the first front transition castings.

In yet another aspect a method can be implemented. The method can comprise: providing a first one-piece transition casting of a set of transition castings; and providing a second one-piece transition casting of the set of transition castings, the second one-piece transition casting being separate and distinct from the first one-piece transition casting, wherein each of the first and second one-piece transition castings includes: a connection pad at a first end, a node at a second end opposite the first end, a pair of opposing ribs between the connection pad and the node, a first concave portion on a first side of a first one of the opposing ribs, and a second concave portion on a second side of said one of the opposing ribs, wherein, for each of the first and second one-piece transition castings, in a side elevational view, an acute angle is formed on a same side as the first and second concave portions, and wherein each of the first and second one-piece transition castings is coreless, meaning that each of the first and second one-piece transition castings is free of any hollow portions at the node and the connection pad.

DETAILED DESCRIPTION

Embodiments of the present disclosure can involve or be directed to one or more transition connections, and systems, components, and methods thereof.

Figure 1:
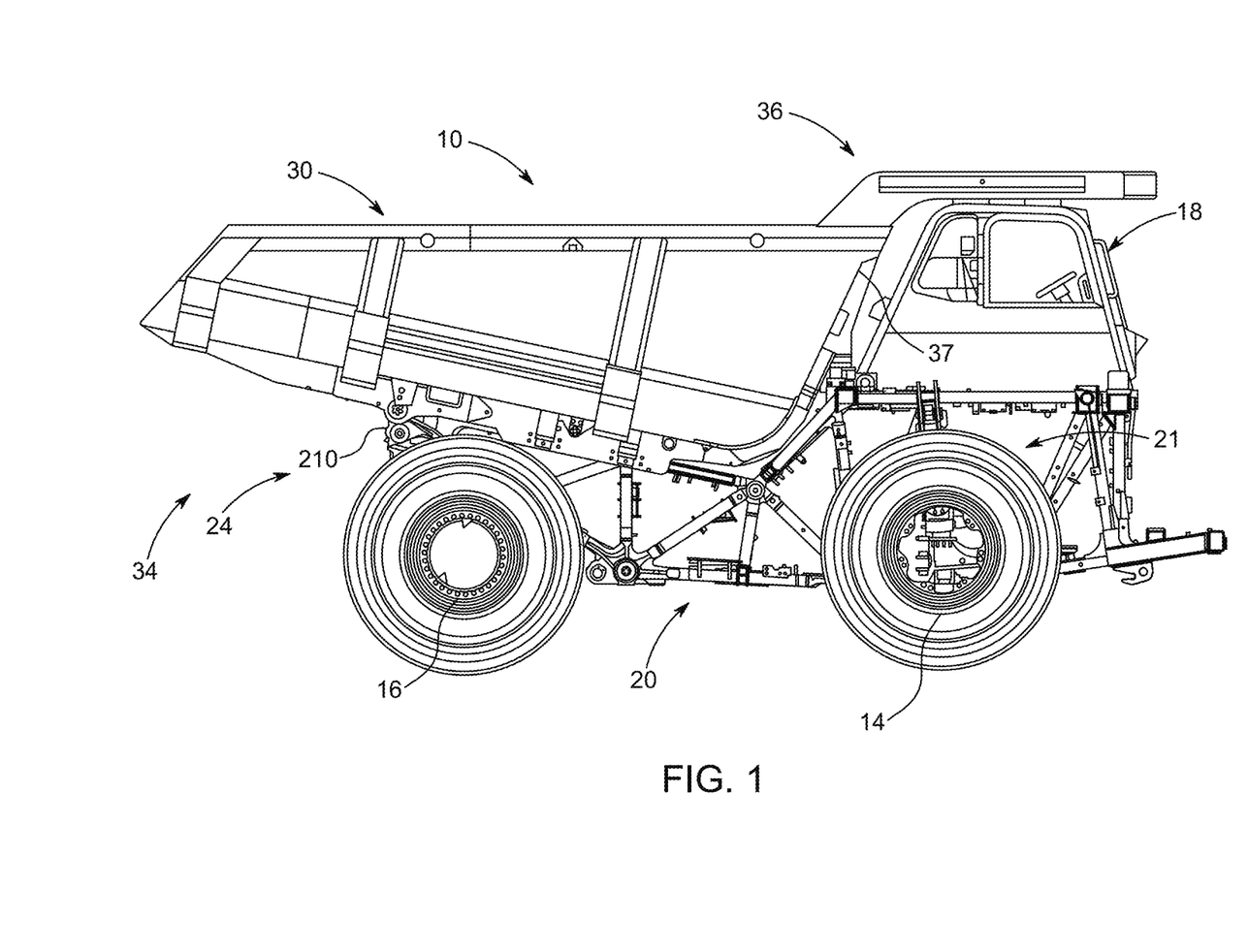
FIG. 1 is a side view of a machine according to embodiments of the disclosed subject matter.

Referring now to the drawings and with specific reference to FIG. 1, this figure illustrates an exemplary embodiment of a machine 10. Machine 10 may be a mobile machine that performs some type of operation associated with an industry such as mining, construction, or any other industry known in the art. For example, as shown in FIG. 1, machine 10 may be an earth moving machine, particularly, an off-highway rear haul truck.

Machine 10 may have a space frame 20 supported by front wheels 14 and rear wheels 16 (including respective tires). The front and rear wheels 14, 16 may be connected to space frame 20 by front suspension members and rear suspension systems, respectively. Machine 10 may also include a bed or body 30 supported by the space frame 20. Such bed or body 30 may be referred to herein as a dump body 30. The dump body 30 can be configured as a receptacle to receive hauling material.

A rear portion 34 of the dump body 30 can be pivotably coupled or attached to a portion (including portions) at a rear 24 of the space frame 20. Discussed in more detail below, portions of the dump body 30 between the rear portion 34 and a front portion 36 of the dump body 30 can be movably positioned relative to respective portions of the space frame 20 to support the dump body 30 on the space frame 20 at a rest position of the dump body 30. The rest position of the dump body 30 may be considered as positioning of the dump body 30 such that the front portion 36 of the dump body 30 is at a lower-most position (i.e., not raised). The dump body 30 can be pivoted at the rear portion 34 about the rear 24 of the space frame 20 to raise or lower the portion of the dump body 30 in front of the pivot (and hence move the portion of the dump body 30 behind the pivot in the opposite direction). Such pivoting of the dump body 30 to raise the front portion 36 of the dump body 30 can be to dump content from within the dump body 30. Likewise, pivoting of the dump body 30 to lower the front portion 36 of the dump body 30 to the rest position can be to receive content in the dump body 30.

Machine 10 may have an operator cabin 18 supported by the space frame 20 at a front of the space frame 20. Machine 10 may also be equipped with a steering mechanism and controls to move the machine 10 and controls to raise and lower dump body 30. The steering mechanism and the controls may be located within the operator cabin 18 of the machine 10.

Machine 10 may have a prime mover supported by the space frame 20. Generally, the prime mover may be provided in a space 21 of the space frame 20. The prime mover may be configured to propel the front and rear wheels 14, 16 in the forward or rearward direction. The prime mover may be lengthwise aligned on space frame 20 along a travel direction of the machine 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train to transfer motive power to move the front and/or rear wheels 14, 16 in a forward or rearward direction.

Exhaust from the prime mover may be output from one or more exhaust outputs. Optionally, the one or more exhaust outputs may be provided generally between the operator cabin 18 and a front wall 37 of the dump body 30 such that exhaust is provided toward at least a predetermined portion of the front wall 37. A coupling (e.g., bellows) may be provided to connect the one or more exhaust outputs to the front wall 37 of the dump body 30, for instance, to a heating channel provided in or on the front wall 37 of the dump body 30 to heat the material carried in the dump body 30.

In general, a space frame according to embodiments of the disclosed subject matter, such as space frame 20, may be a frame that includes structural members connected to each other at nodes and/or joints. The structural members can include hollow tubes and/or solid tubes, and in some instances can be connected according to a triangulated structural. The structural members can be made of metal, metal alloys, or reinforced composite materials, for instance.

Figure 2:
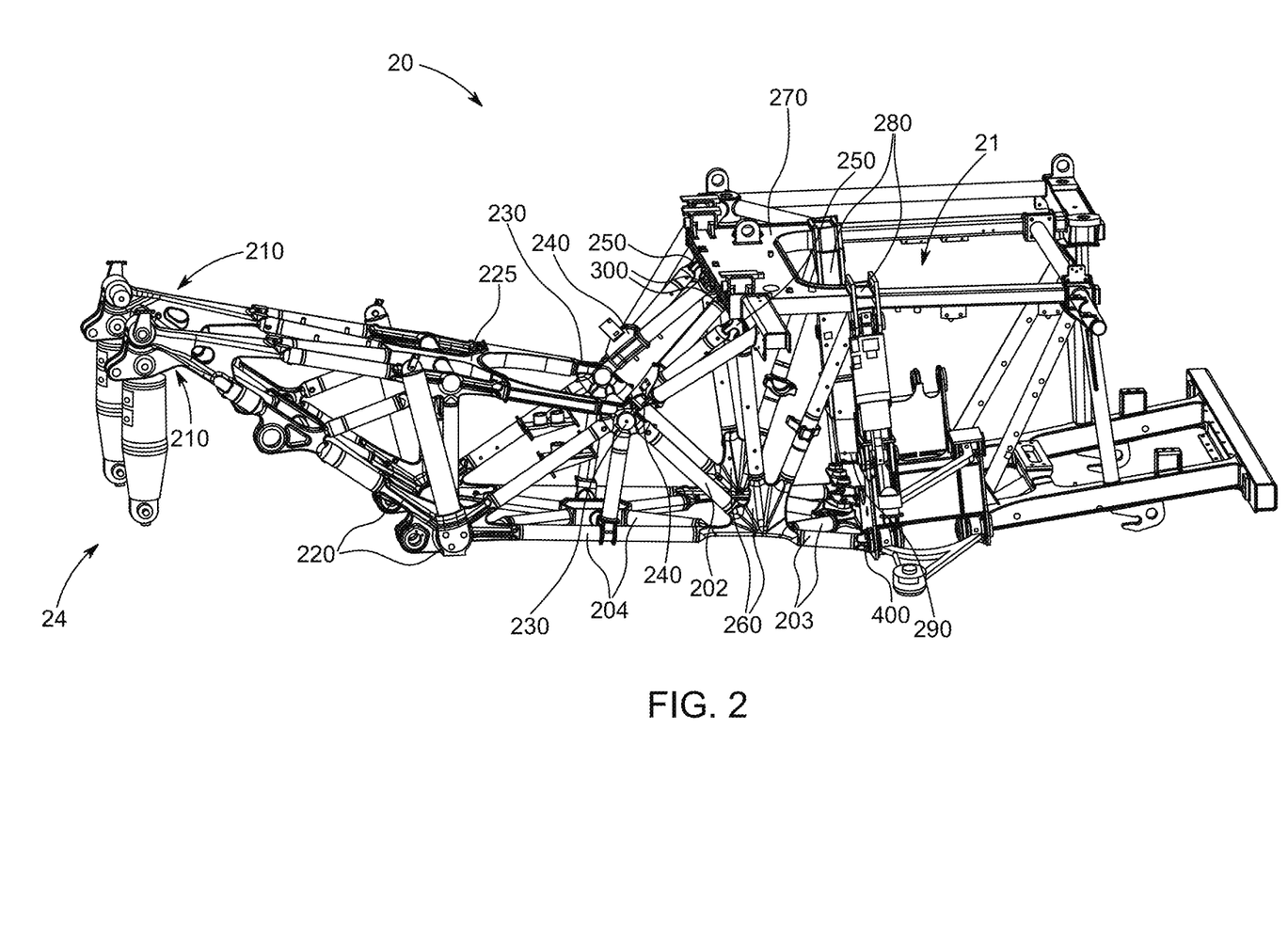
FIG. 2 is a side view of a space frame according to embodiments of the disclosed subject matter.

FIG. 2 is a more detailed view of the space frame 20. As shown, the space frame 20 can include a pair of rear frame connections 210 at the rear 24 of the space frame 20, a pair of center lower frame connections 220, a center upper horizontal frame connection 225, a pair of center upper frame connections 230, a pair of center upper frame nodal connections 240, a pair of front upper frame connections 250, a pair of front lower frame connections 260, a front upper frame connection 270, a pair of front upper suspension connections 280, a front lower suspension connection 290, a pair of upper front transition connections 300, and a pair of lower front transition connections 400. Though the foregoing connections are described as pairs, the connections of a pair may not necessarily be identical. For instance, the connections of a pair may be symmetrical, generally, but not necessarily identical. Optionally, according to one or more embodiments, the lower front transition connections 400 can be mirror images of each other (in the width direction of the spaced frame). The foregoing connections can be regarding as castings or fabrications. In general, a casting may refer to a connection that is not welded to another support component of the space frame 20, and a fabrication may refer to a connection that is welded to another support component of the space frame 20.

The upper front transition connections 300 may be at the same height in the space frame, and the lower front transition connections 400 may be at the same height in the space frame. As shown in FIG. 2, the pair of upper front transition connections 300 can be at a first height in the space frame 20 higher than the pair of lower front transition connections 400. Incidentally, the upper front transition connections 300 may be regarded as first transition connections and the lower front transition connections 400 may be regarded as second transition connections.

The space frame 20 can also include a plurality of elongate support members, such as elongate support members 201, elongate support members 202, and elongate support members 203. Elongate support members, according to embodiments of the disclosed subject matter, can be in the form of rods and/or tubes, circular, for instance, where some or all of the rods and/or tubes may be solid or hollow.

Figure 3:
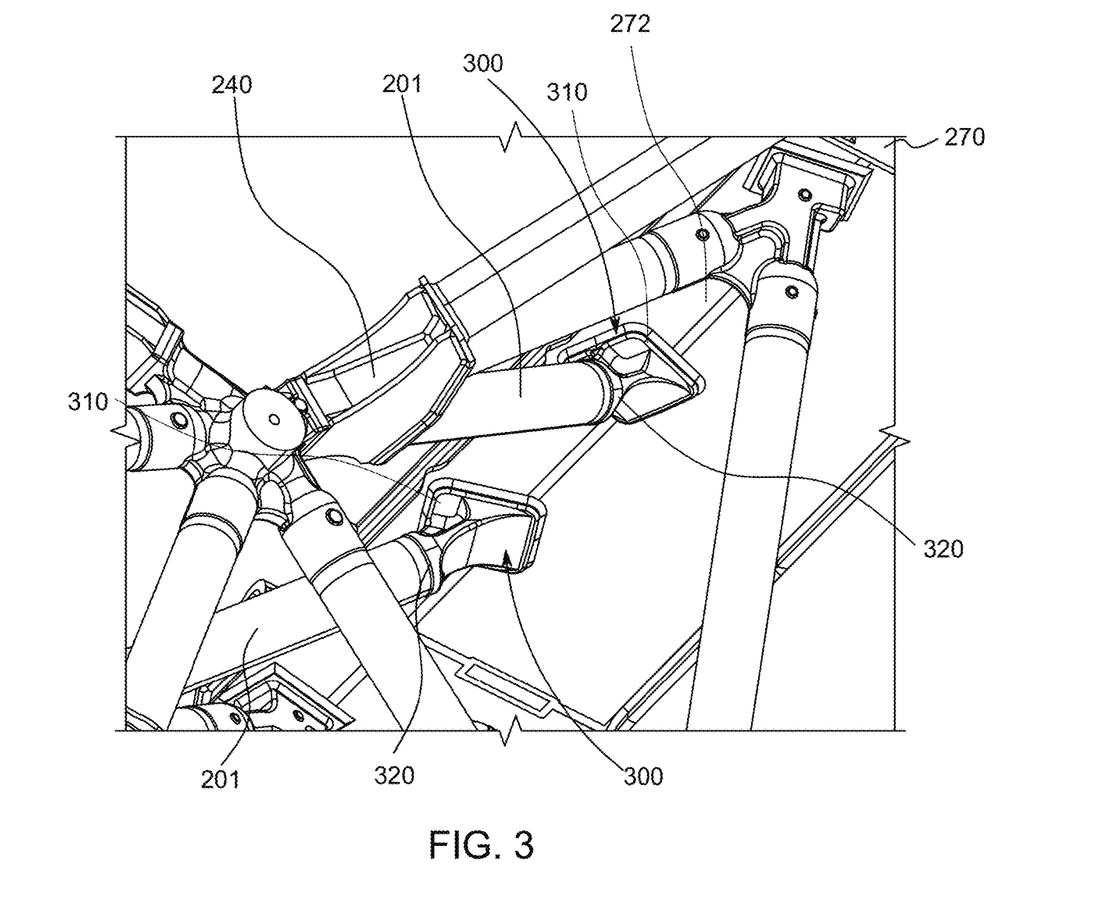
FIG. 3 shows a pair of first transition connections according to one or more embodiments of the present disclosure, implemented in the space frame of FIG. 2.

Referring now to FIG. 3, this figure shows the upper front transition connections 300, wherein such connections may be referred to herein simply as transition connections 300. Embodiments of the present disclosure can be directed to a single transition connection 300 or a pair or set of the transition connections 300. In the case of the set, the set can include just the pair of transition connections 300 or the transition connections 300 and the pair of transition connections 400.

As shown in FIG. 3, each transition connection 300 can be fixedly coupled (e.g., welded) at a first end to a bottom surface 272 of the front upper frame connection 270 and at a second end to the elongate support member 201. The arrangement of the transition connections 300 can be such that the respective elongate support members 201 extend away from each other, toward respective center upper frame nodal connections 240.

Figure 4:
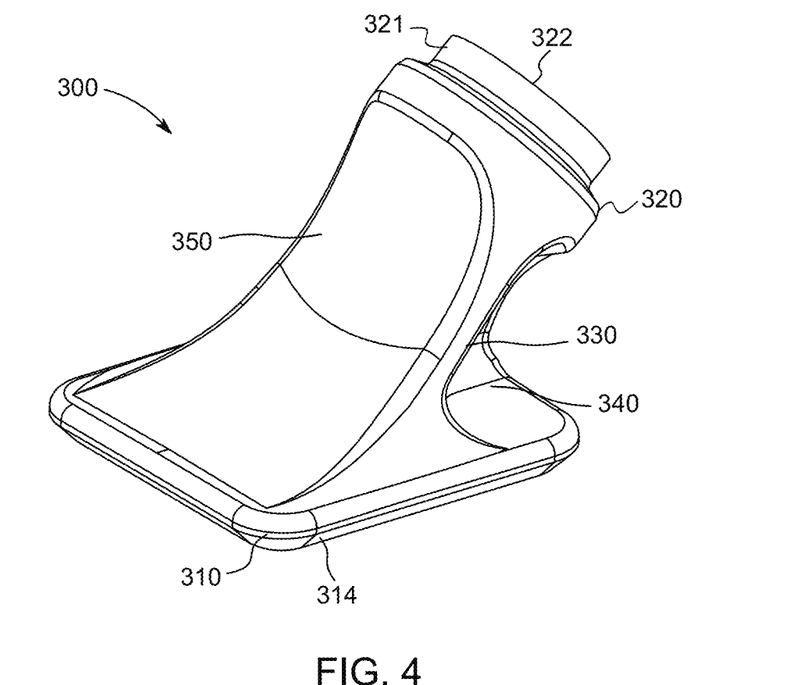
FIG. 4 is a top perspective view of one of the first transition connections of FIG. 3.
Figure 5:
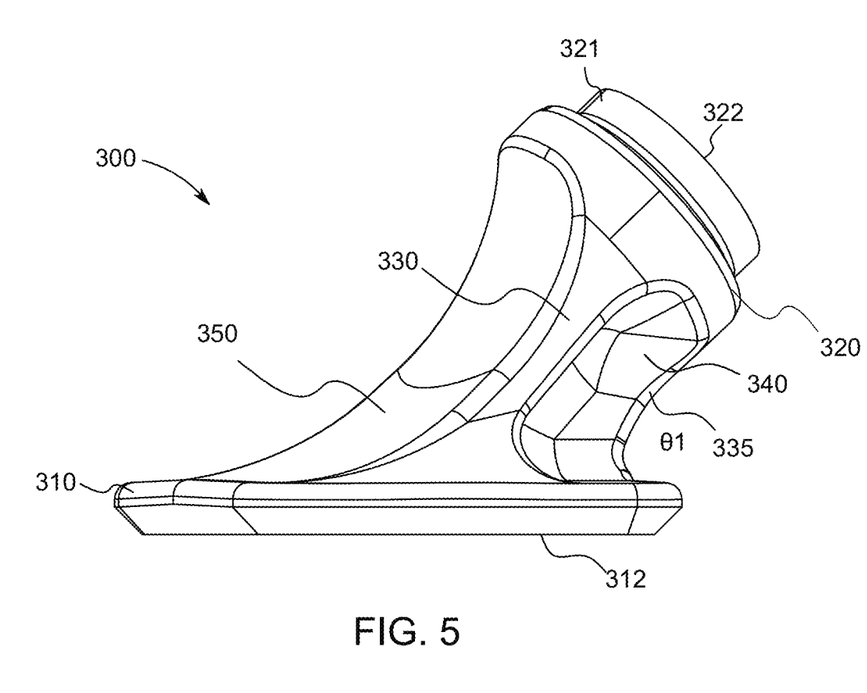
FIG. 5 is a side view of the first transition connection of FIG. 4.
Figure 6:
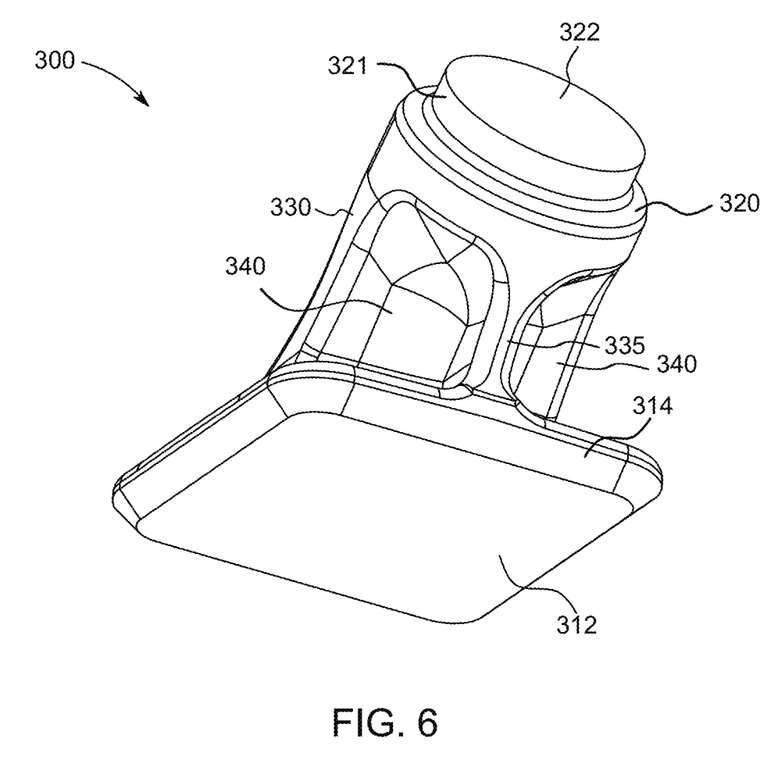
FIG. 6 is a bottom perspective view of the first transition connection of FIG. 4.

Referring also now to FIGS. 4-6, and more specifically regarding the transition connection 300, each transition connection 300 can include a connection pad 310 at or which may define the first end of the transition connection 300, a node 320 at or which may define the second end of the transition connection 300, and a pair of ribs 330 on opposite sides of the transition connection 300 and between the connection pad 310 and the node 320 in a length direction of the transition connection 300. The ribs 330 may be regarded as opposing ribs. The ribs 330 may be identical.

As shown in FIG. 3, the connection pad 310 can be fixedly coupled (e.g., via welding) to the bottom surface 272 of the front upper frame connection 270, and the node 320 can be fixedly coupled (e.g., via welding) to the elongate support member 201. According to one or more embodiments, in a side elevational view of the transition connection 300, the ribs 330 can be aligned with the corresponding elongate support member 201.

The transition connection 300, which can be a casting, can be a one-piece (i.e., single, integral, or unitary) casting. Further, the transition connection 300 can have no hollow core. Put another way, the transition connection 300 can be coreless. This can mean that the transition connection 300 can be free of any hollow portions, for instance, at the node 320 and the connection pad 310. That is, at least the ends of the node 320 and the connection pad 310 can be solid, without any voids, openings, or hollow portions. According to one or more embodiments, all of the node 320 and the connection pad 310 can be solid, without any voids, openings, or hollow portions. Further, optionally, all of the transition connection 300 can be solid and without voids, openings, or hollow portions.

The transition connection 300 can also include a rib 335, a pair of concave portions 340, and an arcuate portion 350. The concave portions 340, which may be identical or of a same configuration, can be referred to as first and second concave portions, and can be on opposite sides of the rib 335, such as shown in FIG. 6. Thus, a first one of the concave portions 340 can be between the rib 335 and one of the ribs 330, and a second one of the concave portions 340 can be between the rib 335 and the other of the ribs 330. The arcuate portion 350 can be opposite the rib 335 and the concave portions 340. The surface of the arcuate portion 350 can be smooth, such as shown in FIG. 4 and FIG. 5.

Generally, the transition connection 300 can be canted or angled. Here, according to embodiments of the present disclosure, the node 320 can extend at an acute angle θ1 relative to a connection surface or face 312 of the connection pad 310, in a side elevational view of the transition connection 300, such as shown in FIG. 5. As an example, the acute angle θ1 can be 45 degrees to 60 degrees. Also, in the side elevational view of the transition connection 300, the connection face 312 of the connection pad 310 can be at an acute angle relative to a face 322 of the node 320. The ribs 330 may also be at the acute angle θ1 relative to the connection face 312. Incidentally, the connection face 312 can be entirely flat, such as shown in FIG. 5 and FIG. 6. According to one or more embodiments, the transition connection 300 can be canted or angled according to a compound angle, meaning, for instance, that in addition to the angle shown in FIG. 5, the transition connection 300 can also be at an angle into or out of the page (still referring to FIG. 5).

According to one or more embodiments, the connection pad 310 can be square in an end view thereof. That is, at least an end portion of the connection pad 310 can be square in an end view of the transition connection 300. Optionally, a perimeter 314 of the connection pad 310 can be chamfered, such as shown in FIGS. 4-6.

The node 320 can be circular in an end view thereof. That is, at least an end portion of the node 320 can be circular, for instance, in the end view. Optionally, the end portion of the node 320 can have a projection 321. Generally, the end portion of the node 320 can be regarded as a machined weld joint.

Figure 7:
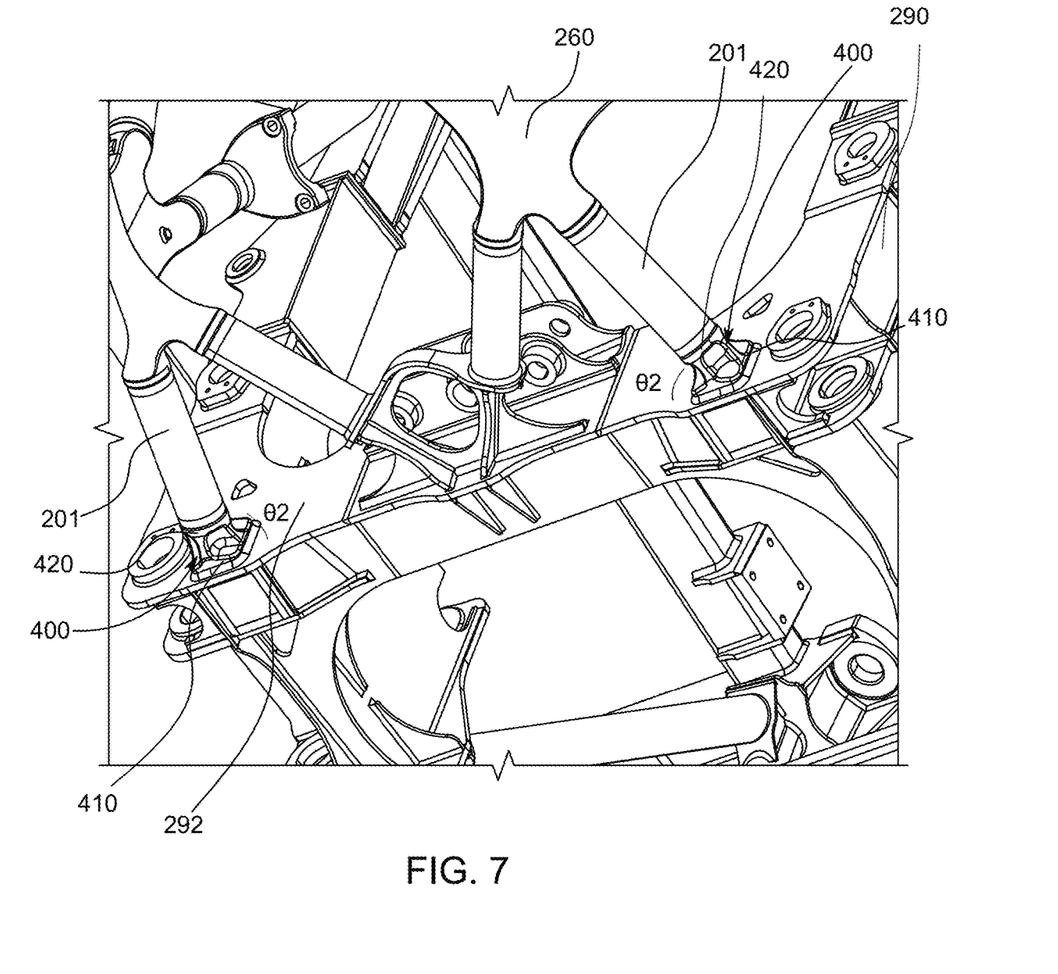
FIG. 7 shows a pair of second transition connections according to one or more embodiments of the present disclosure, implemented in the space frame of FIG. 2.
Figure 8:
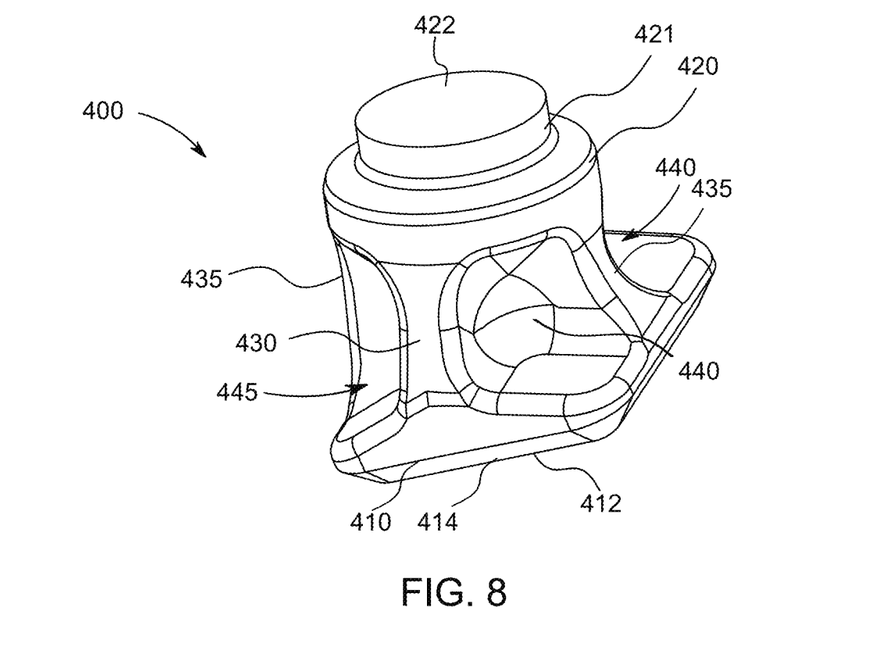
FIG. 8 is a top perspective view of one of the second transition connections of FIG. 7.
Figure 9:
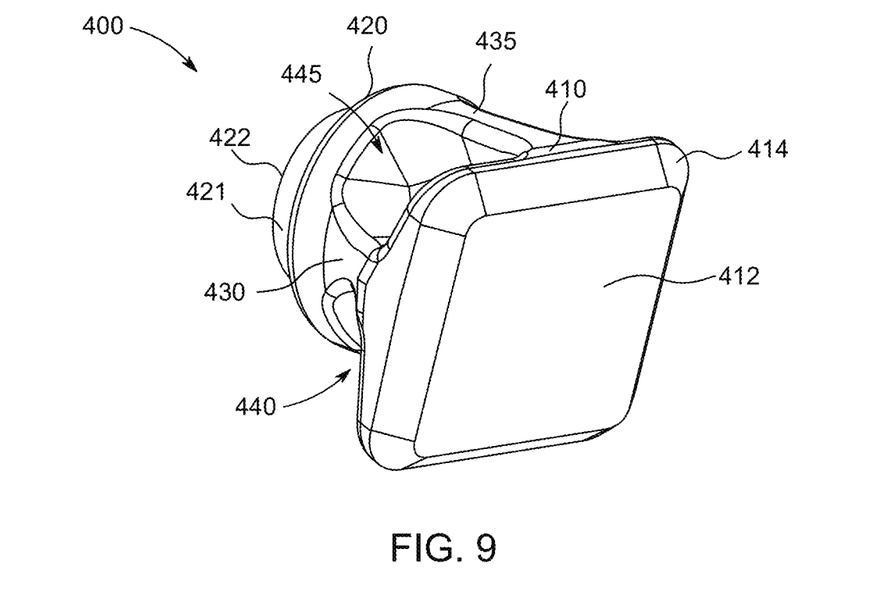
FIG. 9 is a bottom perspective view of the second transition connection of FIG. 8.

Turning now to FIGS. 7-9, these figures show the lower front transition connections 400, wherein such connections may be referred to herein simply as transition connections 400. As noted above, embodiments of the present disclosure can be directed to a single transition connection 400 or a pair or set of the transition connections 400. In the case of the set, the set can include just the pair of transition connections 400 or the transition connections 400 and the pair of transition connections 300.

As shown in FIG. 7, each transition connection 400 can be fixedly coupled (e.g., welded) at a first end to a rear mounting surface 292 of the front lower suspension connection 290 and at a second end to the elongate support member 201. The arrangement of the transition connections 400 can be such that the respective elongate support members 201 extend toward from each other, going away from the front lower suspension connection 290. According to one or more embodiments, the transition connections 400 can be mirrored relative to or mirror images of each other in the width direction of the space frame 20, for instance, when facing each other.

Each transition connection 400 can include a connection pad 410 at or which may define the first end of the transition connection 400, a node 420 at or which may define the second end of the transition connection 400, and a pair of ribs 430 on opposite sides of the transition connection 400 and between the connection pad 410 and the node 420 in a length direction of the transition connection 400. The ribs 430 may be regarded as opposing ribs. The ribs 430 may be identical. According to one or more embodiments, in the side elevational view of the transition connection 400, the ribs 430 can be aligned with the corresponding elongate support member 201.

The transition connection 400, which can be a casting, can be a one-piece (i.e., single, integral, or unitary) casting. Further, the transition connection 400 can have no hollow core. Put another way, the transition connection 400 can be coreless. This can mean that the transition connection 400 can be free of any hollow portions, for instance, at the node 420 and the connection pad 410. That is, at least the ends of the node 420 and the connection pad 410 can be solid, without any voids, openings, or hollow portions. According to one or more embodiments, all of the node 420 and the connection pad 410 can be solid, without any voids, openings, or hollow portions. Further, optionally, all of the transition connection 400 can be solid and without voids, openings, or hollow portions.

The transition connection 400 can also include a pair of ribs 435, a pair of concave portions 440, a pair of concave portions 445. The pair of ribs 430 discussed above may be regarded as a pair of first opposing ribs or simply first ribs, and the pair of ribs 435 may be regarded as a pair of second opposing ribs or simply second ribs. The ribs 435 can be aligned with the corresponding elongate support member 201.

The concave portions 440, which may be identical or of a same configuration, can be referred to as first and second concave portions, and can be on opposite sides one of the ribs 435, such as shown in FIG. 8. Thus, a first one of the concave portions 440 can be between the one of the ribs 435 and one of the ribs 430, and a second one of the concave portions 440 can be between the one rib 435 and the other of the ribs 430. Further, one of the ribs 435 can be between the concave portions 445, and the other of the ribs 435 can be between the concave portions 440. The ribs 435 may be regarded as third and fourth concave portions.

Generally, the transition connection 400 can be canted or angled. Here, according to embodiments of the present disclosure, the node 420 can extend at an acute angle θ2 relative to the rear mounting surface 292 of the front lower suspension connection 290, for instance, in a side elevational view of the transition connection 400. As an example, the acute angle θ2 can be 75 degrees to 86 degrees. Also, in the side elevational view of the transition connection 400, the connection face 412 of the connection pad 410 can be at an acute angle relative to a face 422 of the node 420. The ribs 430 may also be at the acute angle θ2 relative to the connection face 412. Incidentally, the connection face 412 can be entirely flat, such as shown in FIG. 9. According to one or more embodiments, the transition connection 400 can be canted or angled according to a compound angle, meaning, for instance, that in addition to the angle θ2, the transition connection 400 can also be at an angle relative to a different axis. Incidentally, the angle θ2 can be greater than the angle θ1 for the transition connection 300. Thus, one of the ribs 435 can be shorter than the other of the ribs 435, such as shown in FIG. 8.

According to one or more embodiments, the connection pad 410 can be square in an end view thereof. That is, at least an end portion of the connection pad 410 can be square in an end view of the transition connection 400. Optionally, a perimeter 414 of the connection pad 410 can be chamfered, such as shown in FIG. 8 and FIG. 9.

The node 420 can be circular in an end view thereof. That is, at least an end portion of the node 420 can be circular, for instance, in the end view. Optionally, the end portion of the node 420 can have a projection 421. Generally, the end portion of the node 420 can be regarded as a machined weld joint.

INDUSTRIAL APPLICABILITY

As noted above, embodiments of the present disclosure can involve or be directed to one or more transition connections, and systems, components, and methods thereof.

Generally speaking, embodiments of the disclosed subject matter can provide a lightweight, durable machine configuration with a reliable support definition of load points between the dump body 30 and the space frame 20, for instance, in light of dimensional variations due to tolerances and/or component deflection.

Also, tubular structures can provide lightweight structures, however, some nodes where multiple tubes come together (i.e., tube-to-tube fabricated node) may only be able to be welded by hand and, furthermore, can be very complicated and difficult to weld.

According to one or more embodiments of the present disclosure, generally speaking, a casting or castings can be implemented. Castings according to one or more embodiments of the present disclosure can allow a mechanized orbital welding process, for instance, using an automated orbital welding machine, to replace some or all manual welding. For instance, automated orbital welding can be implemented on all circular joints. Further, no cores may be used in the casting. Such casting, particularly the solid and coreless nature of the casting at the end portions of the casting, can provide less chance for variability in sidewalls at the end portions.

According to one or more embodiments of the present disclosure, a space frame, such as space frame 20, or portion thereof, such as one or more upper front transition connections, for instance, transition connection(s) 300 and/or one or more lower front transition connections, for instance, transition connection(s) 400, can be provided or implemented (including assembled fully or partially).

As noted above, the transition connection 300 can have the connection pad 310, the node 320, and the ribs 330. The transition connection 300 can also have the concave portions 340, the rib 335, and the arcuate portion 350. As noted above, the transition connection 400 can have the connection pad 410, the node 420, and the ribs 430. The transition connection 400 can also have the concave portions 440, the ribs 435, and the concave portions 445. The concave portions 440 and/or the concave portions 445, each of which may be regarded as cut-outs, recesses, or scalloped portions, may provide clearance to allow access to other portions of the machine 10 or the space frame 20, such as the engine of the machine 10.

A plurality of elongate support members, such as frame tubes 201, can also be provided or implemented, for respectively fixedly attaching (e.g., via welding) to the transition connections 300 and the transition connections 400. A front upper frame connection, such as front upper frame connection 270, and/or a front lower suspension connection, such as front lower suspension connection 290 can be provided or implemented, also for fixedly attaching (e.g., via welding) to the transition connection 300 and the transition connection 400, respectively. Here, in providing the transition connection 300 and the transition connection 400, the respective weld joints can be moved away from the bottom surface 272 of the front upper frame connection 270 and the rear surface 292 of the front lower suspension connection 290, respectively. This can allow mechanized orbital welding at at least the interface between the transition connections 300, 400 and the respective elongate support members. Optionally, it may be not be necessary to implement a post-weld treatment to some or all of the weld joints.

Embodiments of the disclosed subject matter can also be as set forth according to the following parentheticals.

(1) A space frame for an off-highway rear haul truck comprising: a pair of first front transition castings spaced from each other in a width direction of the space frame; a pair of second front transition castings spaced from each other in the width direction of the space frame, wherein each of the first front transition castings is coreless and includes: a connection pad on a first end of the first front transition casting and configured to weldably attach to a bottom surface of a front upper frame connection of the space frame, and a node on a second end of the first front transition casting opposite the first end and configured to weldably attach to a first frame tube, wherein each of the second front transition castings is coreless and includes: a connection pad on a first end of the second front transition casting and configured to weldably attach to a rear mounting surface of a front lower suspension connection of the space frame, and a node on a second end of the second front transition casting opposite the first end and configured to weldably attach to a second frame tube, wherein coreless means that each of the first front transition castings and each the second front transition castings is free of any hollow portions at any of the nodes and the connection pads, wherein the pair of first front transition castings are at a first height in the space frame higher than a second height of the pair of second front transition castings, wherein, for each of the first front transition castings, in a side elevational view thereof, a connection face of the connection pad is at a first acute angle relative to a face of the node, and wherein, for each of the second front transition castings, in a side elevational view thereof, a connection face of the connection pad is at a second acute angle relative to a face of the node, the second acute angle being different from the first acute angle of the first front transition castings.

(2) The space frame according to (1), wherein the pair of second front transition castings are mirrored relative to each other in the width direction of the space frame.

(3) The space frame according to (1) or (2), wherein the first acute angle is less than the second acute angle.

(4) The space frame according to any one of (1) to (3), wherein each of the first front transition castings further includes: a pair of opposing ribs on opposite sides of the first front transition casting, another rib between the pair of opposing ribs, a first concave portion between said another rib and a first one of the ribs of the pair of opposing ribs, a second concave portion between said another rib and a second one of the ribs of the pair of opposing ribs, and an arcuate portion opposite the first and second concave portions.

(5) The space frame according to any one of (1) to (4), wherein each of the second front transition castings further includes: a pair of first opposing ribs on opposite sides of the second front transition casting, a pair of second opposing ribs on opposite sides of the second front transition casting, a pair of first concave portions between the pair of first opposing ribs, separated by a first one of the second opposing ribs, and a pair of second concave portions between the pair of first opposing ribs, separated by a second one of the second opposing ribs.

(6) The space frame according to any one of (1) to (5), wherein the first one of the second opposing ribs is shorter than the second one of the second opposing ribs.

(7) The space frame according to any one of (1) to (6), wherein for each connection pad of the first and second front transition castings a perimeter thereof is chamfered.

(8) A set of transition connections for a space frame comprising: a first transition connection; and a second transition connection separate and distinct from the first transition connection, wherein each of the first and second transition connections includes: a connection pad defining a first end, a node defining a second end opposite the first end, a pair of ribs on opposite sides, a first concave portion on a first side of one of the ribs, a second concave portion on a second side of said one of ribs, wherein, for each of the first and second transition connections, in a side elevational view, an acute angle is formed on a same side as the first and second concave portions, and wherein the first and second concave portions are of a same configuration.

(9) The set of transition connections according to (8), wherein the first and second transition connections are castings, wherein the connection pad is square in an end view thereof, and wherein the node is circular in an end view thereof.

(10) The set of transition connections according to (8) or (9), wherein the first transition connection and the second transition connection are mirror images of each other when facing each other.

(11) The set of transition connections according to any one of (8) to (10), wherein each of the first and second transition connections includes an arcuate portion opposite the first and second concave portions.

(12) The set of transition connections according to any one of (8) to (11), wherein each of the first and second transition connections includes: another pair of ribs on opposite sides, a third concave portion on a first side of one of the ribs of said another pair, a fourth concave portion on a second side of said one of the ribs of said another pair.

(13) The set of transition connections according to any one of (8) to (12), wherein a first one of the ribs of said another pair of ribs is shorter than a second one of the ribs of said another pair of ribs.

(14) The set of transition connections according to any one of (8) to (13), wherein a perimeter of each of the connection pads is chamfered.

(15) A method comprising: providing a first one-piece transition casting of a set of transition castings; and providing a second one-piece transition casting of the set of transition castings, the second one-piece transition casting being separate and distinct from the first one-piece transition casting, wherein each of the first and second one-piece transition castings includes: a connection pad at a first end, a node at a second end opposite the first end, a pair of opposing ribs between the connection pad and the node, a first concave portion on a first side of a first one of the opposing ribs, and a second concave portion on a second side of said one of the opposing ribs, wherein, for each of the first and second one-piece transition castings, in a side elevational view, an acute angle is formed on a same side as the first and second concave portions, and wherein each of the first and second one-piece transition castings is coreless, meaning that each of the first and second one-piece transition castings is free of any hollow portions at the node and the connection pad.

(16) The method according to (15), further comprising: welding, using an automated welding machine, the nodes of the first and second one-piece transition castings to respective elongate support members; and welding the connection pads of the first and second one-piece transition castings to respective portions of either a bottom surface of a front upper frame connection of a space frame or a rear mounting surface of a front lower suspension connection of the space frame.

(17) The method according to (15) or (16), wherein, in the side elevational view, the opposing ribs are aligned with the respective elongate support members.

(18) The method according to any one of (15) to (17), wherein the first and second one-piece transition castings are at a same height in the space frame.

(19) The method according to any one of (15) to (18), wherein, in the side elevational view, the opposing ribs are at the acute angle relative to a flat connection surface of the connection pad (20) The method according to any one of (15) to (19), further comprising: providing a first one-piece transition casting of another set of transition castings; and providing a second one-piece transition casting of said another set of transition castings, wherein the first and second one-piece transition castings of said another set of transition castings are different in terms of configuration from the first and second one-piece transition castings of said set of transition castings.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A space frame for an off-highway rear haul truck comprising:
   a pair of first front transition castings spaced from each other in a width direction of the space frame;
   a pair of second front transition castings spaced from each other in the width direction of the space frame,
   wherein each of the first front transition castings is coreless and includes:
      a connection pad on a first end of the first front transition casting and configured to weldably attach to a bottom surface of a front upper frame connection of the space frame, and
      a node on a second end of the first front transition casting opposite the first end and configured to weldably attach to a first frame tube,
   wherein each of the second front transition castings is coreless and includes:
      a connection pad on a first end of the second front transition casting and configured to weldably attach to a rear mounting surface of a front lower suspension connection of the space frame, and
      a node on a second end of the second front transition casting opposite the first end and configured to weldably attach to a second frame tube,
   wherein coreless means that each of the first front transition castings and each the second front transition castings is free of any hollow portions at any of the nodes and the connection pads,
   wherein the pair of first front transition castings are at a first height in the space frame higher than a second height of the pair of second front transition castings,
   wherein, for each of the first front transition castings, in a side elevational view thereof, a connection face of the connection pad is at a first acute angle relative to a face of the node, and
   wherein, for each of the second front transition castings, in a side elevational view thereof, a connection face of the connection pad is at a second acute angle relative to a face of the node, the second acute angle being different from the first acute angle of the first front transition castings.

2. The space frame according to claim 1, wherein the pair of second front transition castings are mirrored relative to each other in the width direction of the space frame.

3. The space frame according to claim 1, wherein the first acute angle is less than the second acute angle.

4. The space frame according to claim 1, wherein each of the first front transition castings further includes:
   a pair of opposing ribs on opposite sides of the first front transition casting,
   another rib between the pair of opposing ribs,
   a first concave portion between said another rib and a first one of the ribs of the pair of opposing ribs,
   a second concave portion between said another rib and a second one of the ribs of the pair of opposing ribs, and
   an arcuate portion opposite the first and second concave portions.

5. The space frame according to claim 1, wherein each of the second front transition castings further includes:
   a pair of first opposing ribs on opposite sides of the second front transition casting,
   a pair of second opposing ribs on opposite sides of the second front transition casting,
   a pair of first concave portions between the pair of first opposing ribs, separated by a first one of the second opposing ribs, and
   a pair of second concave portions between the pair of first opposing ribs, separated by a second one of the second opposing ribs.

6. The space frame according to claim 5, wherein the first one of the second opposing ribs is shorter than the second one of the second opposing ribs.

7. The space frame according to claim 1, wherein for each connection pad of the first and second front transition castings a perimeter thereof is chamfered.

8. A set of transition connections for a space frame comprising:
a first transition connection; and
a second transition connection separate and distinct from the first transition connection,
wherein each of the first and second transition connections includes:
a connection pad defining a first end,
a node defining a second end opposite the first end,
a pair of ribs on opposite sides,
a first concave portion on a first side of one of the ribs,
a second concave portion on a second side of said one of ribs,
wherein, for each of the first and second transition connections, in a side elevational view, an acute angle is formed on a same side as the first and second concave portions, and
wherein the first and second concave portions are of a same configuration.

9. The set of transition connections according to claim 8,
wherein the first and second transition connections are castings,
wherein the connection pad is square in an end view thereof, and
wherein the node is circular in an end view thereof.

10. The set of transition connections according to claim 8, wherein the first transition connection and the second transition connection are mirror images of each other when facing each other.

11. The set of transition connections according to claim 8, wherein each of the first and second transition connections includes an arcuate portion opposite the first and second concave portions.

12. The set of transition connections according to claim 8, wherein each of the first and second transition connections includes:
another pair of ribs on opposite sides,
a third concave portion on a first side of one of the ribs of said another pair, and
a fourth concave portion on a second side of said one of the ribs of said another pair.

13. The set of transition connections according to claim 12, wherein a first one of the ribs of said another pair of ribs is shorter than a second one of the ribs of said another pair of ribs.

14. The set of transition connections according to claim 8, wherein a perimeter of each of the connection pads is chamfered.

15. A method comprising:
providing a first one-piece transition casting of a set of transition castings; and
providing a second one-piece transition casting of the set of transition castings, the second one-piece transition casting being separate and distinct from the first one-piece transition casting,
wherein each of the first and second one-piece transition castings includes:
a connection pad at a first end,
a node at a second end opposite the first end,
a pair of opposing ribs between the connection pad and the node,
a first concave portion on a first side of a first one of the opposing ribs, and
a second concave portion on a second side of said one of the opposing ribs,
wherein, for each of the first and second one-piece transition castings, in a side elevational view, an acute angle is formed on a same side as the first and second concave portions, and
wherein each of the first and second one-piece transition castings is coreless, meaning that each of the first and second one-piece transition castings is free of any hollow portions at the node and the connection pad.

16. The method according to claim 15, further comprising:
welding, using an automated welding machine, the nodes of the first and second one-piece transition castings to respective elongate support members; and
welding the connection pads of the first and second one-piece transition castings to respective portions of either a bottom surface of a front upper frame connection of a space frame or a rear mounting surface of a front lower suspension connection of the space frame.

17. The method according to claim 16, wherein, in the side elevational view, the opposing ribs are aligned with the respective elongate support members.

18. The method according to claim 16, wherein the first and second one-piece transition castings are at a same height in the space frame.

19. The method according to claim 15, wherein, in the side elevational view, the opposing ribs are at the acute angle relative to a flat connection surface of the connection pad.

20. The method according to claim 15, further comprising:
providing a first one-piece transition casting of another set of transition castings; and
providing a second one-piece transition casting of said another set of transition castings,
wherein the first and second one-piece transition castings of said another set of transition castings are different in terms of configuration from the first and second one-piece transition castings of said set of transition castings.

* * * * *